United States Patent [19]

Lankheet

[11] 4,333,186
[45] Jun. 8, 1982

[54] SWIMMING POOL CONSTRUCTION

[76] Inventor: Jay A. Lankheet, 1329 Bayview Ave., Holland, Mich. 49423

[21] Appl. No.: 73,555

[22] Filed: Sep. 7, 1979

[51] Int. Cl.³ .......................... E04H 3/16; E04H 3/18
[52] U.S. Cl. ........................................... 4/506; 4/507; 4/508; 4/493; 52/169.5; 52/227; 126/415; 126/416; 126/417
[58] Field of Search .................. 4/488, 506, 493, 502, 4/500, 494, 496, 498, 499, 503, 507, 508, 509; 126/415, 416, 417; 52/227, 169

[56] References Cited

U.S. PATENT DOCUMENTS

| | | | |
|---|---|---|---|
| 3,050,743 | 8/1962 | Lamb | 4/502 |
| 3,060,455 | 10/1962 | Lamb | 4/500 |
| 3,064,273 | 11/1962 | Knake | 4/506 X |
| 3,553,744 | 1/1971 | Gillen | 4/506 |
| 3,555,575 | 1/1971 | Schwarz et al. | 4/493 |
| 3,613,126 | 10/1971 | Granderath | 4/502 |
| 3,654,639 | 4/1972 | Lankheet | 4/506 |
| 3,667,071 | 6/1972 | Hoch et al. | 4/506 X |
| 3,720,964 | 3/1973 | Thomson | 4/506 X |
| 3,735,427 | 5/1973 | Ancewicz | 4/506 |
| 3,739,539 | 6/1973 | Posnick | 52/169 |
| 3,832,741 | 9/1974 | Ward | 4/500 |
| 3,885,364 | 5/1975 | Lankheet | 52/169 |
| 3,892,096 | 7/1975 | Macchi | 52/227 |
| 3,903,667 | 9/1975 | Zetlin | 52/227 |
| 3,945,059 | 3/1976 | Alloeco, Jr. | 126/415 |
| 4,090,496 | 5/1978 | Mallet | 126/415 |
| 4,132,074 | 1/1979 | Wendel | 126/415 X |
| 4,146,015 | 3/1979 | Acker | 4/493 |
| 4,205,499 | 6/1980 | Lankheet | 4/506 X |
| 4,219,894 | 9/1980 | Jakowicki | 4/506 X |

FOREIGN PATENT DOCUMENTS 616608  3/1961  Canada .................................. 52/169

Primary Examiner—Henry K. Artis
Attorney, Agent, or Firm—Price, Heneveld, Huizenga & Cooper

[57] ABSTRACT

The specification discloses a removable swimming pool construction having a plurality of prefabricated side and deck panels which are supported on adjustable frame members, and are installed in a manner which imparts to the pool the appearance of a permanent pool construction. The deck panels are interconnected by rods which extend longitudinally under the deck panels through end flanges thereof, and include a tightening mechanism to align and draw the panels securely together. The deck panels include a tortuously extending water passageway therethrough which communicates with the water in the pool. A pump flows the pool water through the passageway, such that solar heat collected in the deck is transferred to the water, thereby heating the same and simultaneously cooling the deck surface. A flexible pool cover is mounted in one end of the pool, and is wound on a rotatable drum for extending and retracting the same over the surface of the water.

31 Claims, 9 Drawing Figures

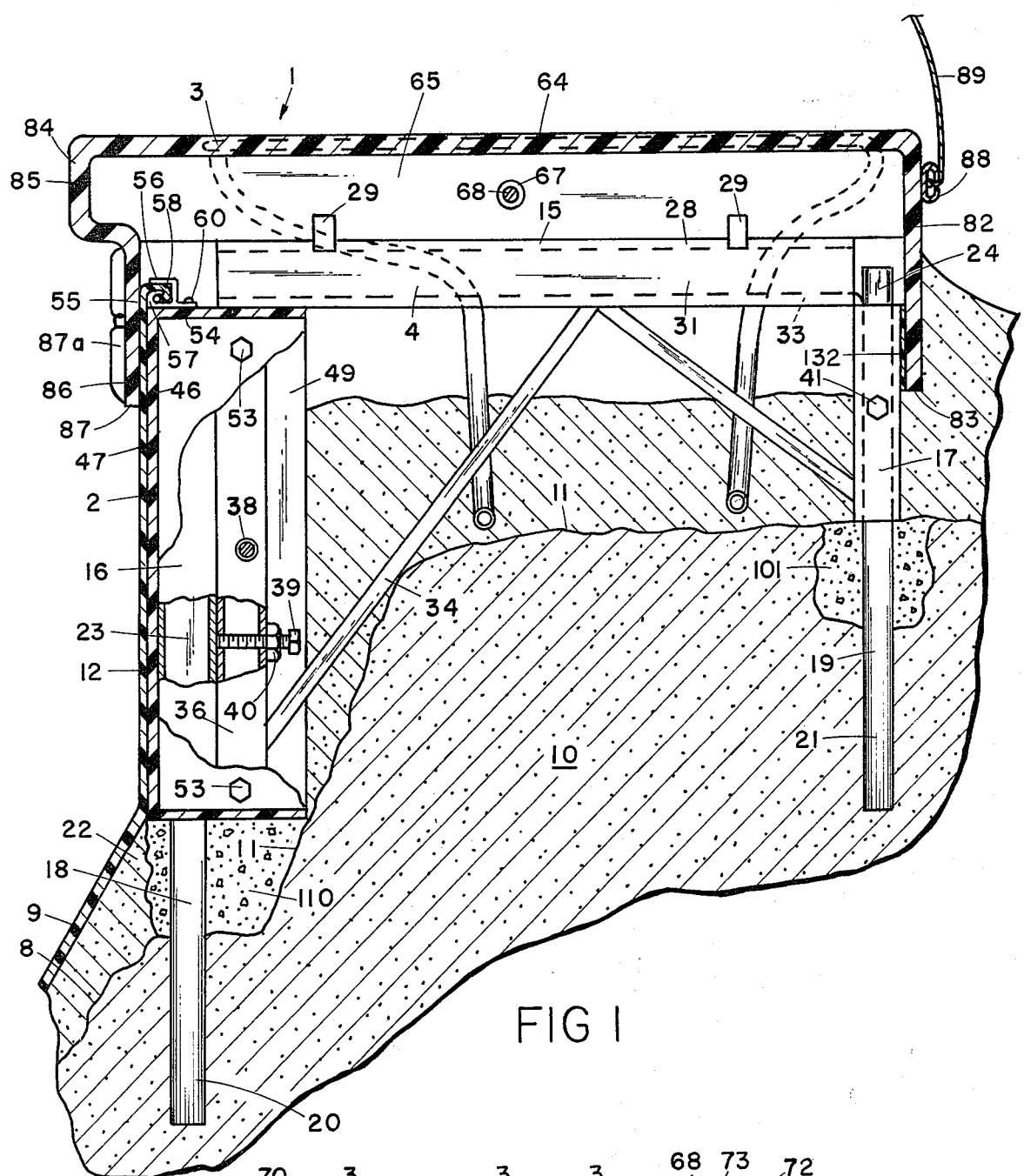
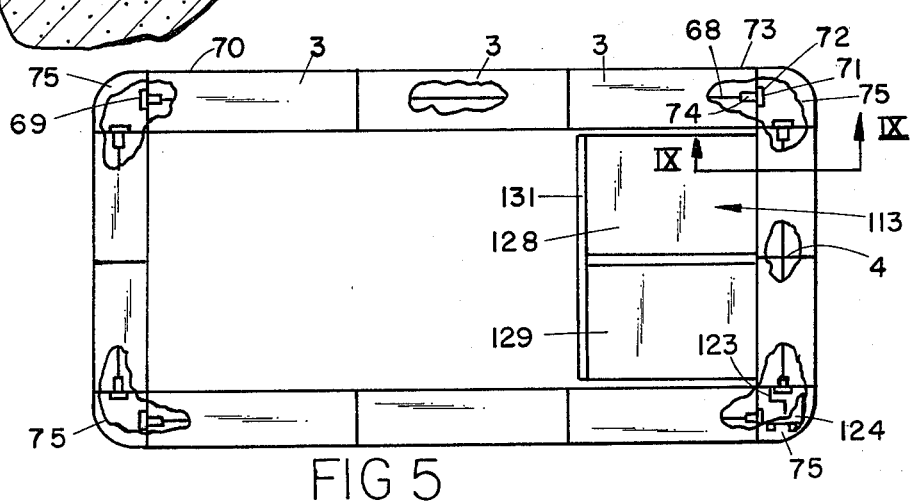

SWIMMING POOL CONSTRUCTION

BACKGROUND OF THE INVENTION

The present invention relates to swimming pools, and in particular, to prefabricated or modularized swimming pool constructions.

As a result of my own prior inventions, modularized swimming pool constructions, which comprise a plurality of interconnected, prefabricated panels, have become extremely popular as an alternative to conventional concrete pool constructions, particularly in swimming pools for private homes. Poured concrete pools and pools made of prefabricated panels are typically installed below the ground and are considered "permanent". The prefabricated wall panels are typically anchored in concrete footings at the base and in a concrete pool court surrounding the pool at the top.

Another type of pool employs a relatively short wall panel secured to a redwood deck structure which replaces the conventional concrete pool court. Because the wall panels are not anchored in concrete, and because the redwood decks can be disassembled, such constructions are considered to be removable pools. The present invention relates to a removable type of pool construction which includes prefabricated side walls, and a bottom contructed of a flexible liner which is attached to the side wall at the upper edge of the pool.

In all types of pool constructions, a deck or court is provided about at least a portion of the marginal edge of the pool to safely effect the ingress and egress of bathers therefrom. In removable pool constructions, such decks are typically a rather narrow structure which encircles the pool and are supported by piers which extend a spaced apart distance above the ground at a plane which is substantially even with the upper edge of the pool reservoir. Although such decks can be constructed of redwood and other attractive materials, the raised deck design detracts from the overall appearance of the pool, and imparts a cheap, nonpermanent appearance thereto which is typically considered unsightly. The partially in-ground type of removable pool was in part developed in an attempt to alleviate this particular problem. However, heretofore, even though a partially in-ground pool may have only a small portion of the pool projecting above the ground, the raised deck structure thereof gives the entire pool a transient appearance.

Installation of removable pools also requires a substantial amount of time and effort to ensure that the liner and deck panels are level, so that the water will rise to a height spaced equidistantly around the rim of the pool, and so that the deck will present a safe walking surface. Further, the deck panels must be accurately aligned and securely interconnected in a manner which does not require a large amount of assemnbly time or manpower.

Swimming pools are normally constructed in locations which have been completely cleared of trees and other overhead foilage and obstructions which might interfere with the bathers' activities, and/or permit debris or other foreign matter to be deposited in swimming pool water. However, because swimming pools are located in such open locations, the deck of the pool is normally exposed to direct sunlight and radiant rays throughout the day. Hence, the deck can become very hot and uncomfortable, or even unmanagable to walk upon, even when the air and/or water temperatures are relatively low. Further, even though a swimming pool is located at an open location, airborne debris and other foreign matter inevitably enters the pool, particularly during long hours of non-use, such as during the night, thereby requiring substantial maintenance efforts to keep the water clean.

SUMMARY OF THE INVENTION

The present invention provides a swimming pool construction comprising a plurality of prefabricated panels which are supported on adjustable frame members and which are interconnected in a manner which imparts to the pool an attractive, permanent appearance.

Another aspect of the present invention is to interconnect the deck panels of the pool by rods which extend longitudinally under the deck panels through end flanges thereof, and include a tightening mechanism which aligns the deck panels and draws the same securely together.

In yet another aspect of the present invention, the deck panels include a tortuously extending water passageway therethrough which communicates with the water in the pool, whereby the pool water flows through the deck thereby heating the water and simultaneously cooling the deck surface.

In yet another aspect of the present invention, a flexible pool cover is mounted in one end of the pool and is wound about a rotatable drum for extending or retracting the same over the surface of the water to alleviate heat loss at night, improve solar heat absorption during the day, and prevent debris and other foreign materials from being deposited in the water.

In yet another aspect of the present invention, the deck panels include a channel along the rear edge thereof for retaining a domed pool closure therein.

These and many other important advantages of the invention will be further understood and appreciated by those skilled in the art by reference to the following written specification, claims and appended drawings.

BRIEF DESCRIPTION OF THE DRAWINGS

FIG. 1 is a vertical cross sectional view of a swimming pool construction embodying the present invention, with portions thereof broken away to reveal internal construction.

FIG. 5 is a partially schematic view of the pool construction, particularly showing rods interconnecting deck panel portions of the construction.

DETAILED DESCRIPTION OF THE PREFERRED EMBODIMENTS

Figure 2:
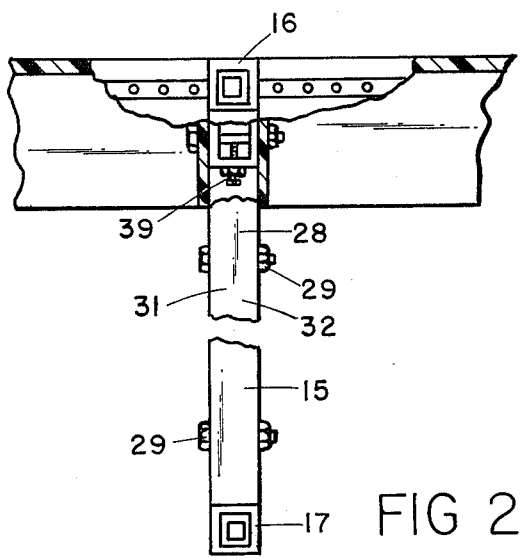
FIG. 2 is a top plan view of a frame and side wall member of the pool construction, with a portion of the side wall broken away to reveal internal construction.

The reference numeral 1 (FIG. 1) generally designates a swimming pool construction embodying the present invention, comprising a plurality of prefabricated side panels 2 and deck panels 3 which are supported on adjustable frame members 4, and are interconnected in a manner which imparts a pleasant, permanent appearance thereto.

The illustrated swimming pool construction 1 (FIG. 1) is a removable pool which is installed partially in the ground. A depression or cavity 8 having a size substantially identical to the desired shape of the pool is dug in the earth, and a layer of sand 9 is positioned over the surface of the undug ground 10. A shallow ledge 11 is formed about the periphery of the cavity 8, and is shaped to mount the frames 4 therein. A flexible, imperforate liner 12 is positioned over the sand layer 9 and forms a basin which is adapted to retain the water therein.

The frames 4 (FIGS. 1, 2 and 3) are substantially identical in shape, and are adapted for retaining the deck panels 3 in a normally, substantially horizontal orientation and the wall panels 2 in a substantially vertical orientation. Each frame 4 comprises an elongated segment of steel or comparable metal tubing of a square or rectangular cross sectional shape. The tubing is partially cut at two spaced points and then bent into a generally "U" shaped configuration to define a forward sleeve or leg 16, and a rear sleeve or leg 17 joined by a cross brace 15. Each cut is through an upper wall 28 and two opposing side walls 31 and 32 whereby the bend is formed in bottom wall 33. Forward and rearward anchoring posts 18 and 19 are provided, with each having the lower end 20 and 21 thereof respectively shaped for anchoring in the ground at a position adjacent to the pool marginal edge 22, and upper ends 23 and 24 respectively, which are telescopically received into the forward and rearward sleeve legs 16 and 17. Anchoring posts 18 and 19 and sleeves 16 and 17 have telescopically mating configurations such that the former fit into the latter. Set screws 39 and 41 respectively are provided to connect the forward and rear anchoring posts 18 and 19 with the respective sleeve leg, wherby the elevation of each of the deck panels 3 is adjustable in infinitesimally small increments for accurately leveling and securely supporting the deck.

The upper surface 28 of the cross brace 15 is substantially planer and adapted for abuttingly supporting a pair of deck panels 3 thereon. Two pairs of tabs 29 are connected with opposing sides 31 and 32 of the cross brace 15, and project upwardly of the upper surface 28 thereof and forms stops which retain the deck panels 3 thereinbetween on the upper surface. A pair of angle braces 34 and 35 connect the cross brace 15 with the lower end 20 and 21 of the front and rear sleeves 16 and 17 to provide additional rigidity thereto.

A second tubular sleeve 37 (FIG. 1) is connected by welding with the rearward surface 37 of the forward sleeve 16 and serves as a bracket to facilitate interconnecting the end of adjacently positioned side panels 2. In this example, sleeve 36 comprises a segment of square tubing, substantially similar in shape to the forward sleeve 16 and is permanently fastened thereto by means such as welding or the like. Three spaced apart apertures 38 are positioned in a regular fashion along sleeve 36, and extend through both of the side faces thereof for purposes to be described in greater detail hereinafter. Set screw 39 (FIGS. 1 and 2) extends through both sleeve bracket 36 and sleeve 16 and is threaded within a nut 40 welded to the surface of the sleeve bracket 36.

Figure 4:
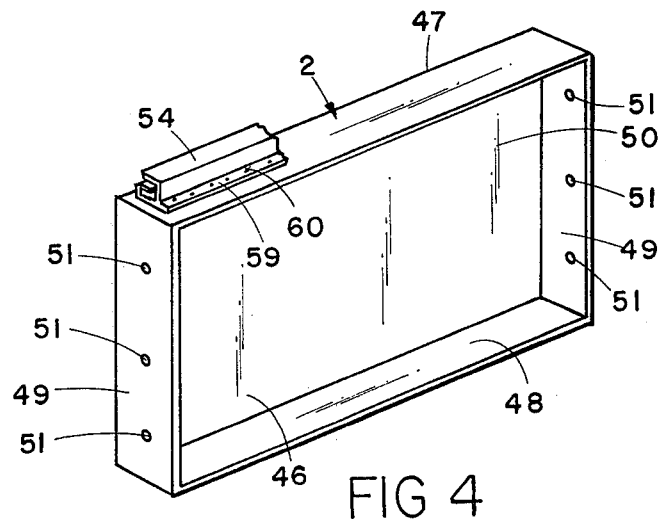
FIG. 4 is a perspective view of the pool side wall.

As best illustrated in FIG. 4, pool side panels 2 comprise a forward panel 46 having a planer exterior surface 47 which abuts and forms the flexible pool liner 12. Side panels 2 include upper, lower, and end flanges 47-49 respectively which are integrally formed and interconnected and project outwardly of the interior surface of forward panel member 46. Side panels 2 have a substantially identical shape for interchangeability, and are preferably integrally constructed, such as molded from a synthetic resin material. The end flanges 49 of deck panel 2 are provided with three spaced apart apertures 51, which are aligned and mate with the corresponding apertures 38 on sleeve bracket 36. The outer surfaces of end flanges 49 are adapted to abut against the side faces of the forward sleeve 16 and the bracket 36, and fasteners 53 extend through the aligned apertures 38 and 51 to interconnect two deck panel sections 3 disposed on opposing sides of the frame 4.

An aluminum liner or plastic retainer extrusion 54 (FIGS. 1 and 4) is attached to upper flange 47 of each wall panel 2 at the forward edge thereof, and is adapted to retain an upper, marginal free edge 55 of the pool liner 12 therein (FIGS. 1 and 4). Extrusion 54 has upper and lower body portions 56 and 57 which are spaced apart at a determined distance and form a gap between which free edge 55 of liner 12 is frictionally retained. The lower portion 57 of clamp 54 includes a leg 58 which extends slightly inwardly in the form of a barb, below which liner edge 55 is positioned. Extrusion 54 also includes a rearwardly extending flange 59 having fastener 60 disposed therealong to attach extrusion 54 to upper flange surface 47 of wall panel 2.

Figure 3:
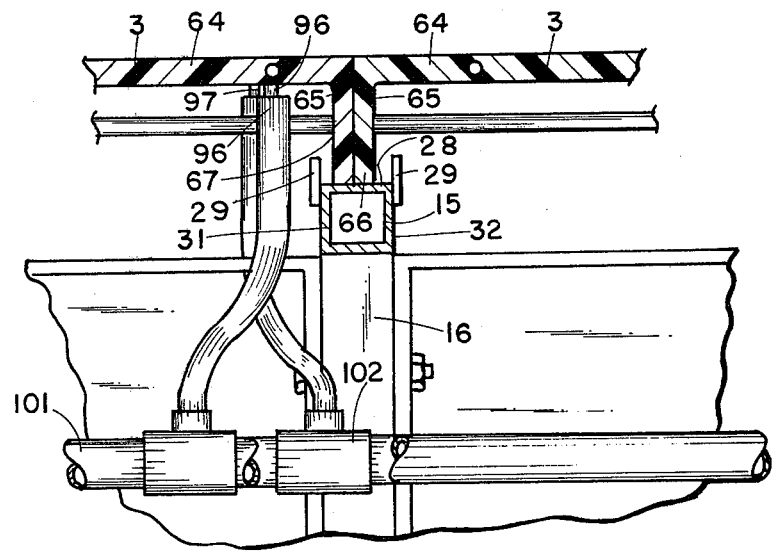
FIG. 3 is a fragmentary vertical cross sectional view of the swimming pool construction.

As best illustrated in FIG. 3, each of the deck panels 3 includes an upper panel 64 with a flange member 65 depending substantially perpendicularly from each end thereof. The exterior surface of the upper panel may be textured to form an attractive, non-slip surface. The end flanges 65 each include a free edge 66 which is adapted for abutment with the upper surface 28 of the cross brace 15. An aperture 67 extends transversely through each of the end flanges 65 at a medial portion thereof (FIG. 1). The flange apertures 67 are aligned in each linear portion of the deck assembly which is to be interconnected in a straight line. An elongate, rigid rod 68 extends through each of the apertures 67, and as schematically illustrated in FIG. 5, has one end 69 thereof connected with one end deck panel 70, and the other end 71 with tightening means 72 to engage the opposite end deck panel 73. The tightening means is adapted to move the rod end 69 with respect to the deck panel 73 and tense rod 68, whereby each of the deck panel sections 3 in the linear subassembly is drawn abuttingly together by the rod to securely and detachably interconnect the same. Each of the illustrated deck panels 3 has a rectangular, elongate shape, wherein the panel sections are positioned in an end-to-end relationship with the end flanges 65 thereof abutting. The illustrated tightening means 72 comprises a threaded end portion 74 of the elongate rod 68 which extends through the end flange of deck panel 73, and a nut threaddedly connected therewith which abuts said end flange and draws the rod outwardly through the aperture 67 in the nature of the turnbuckle. The opposing ends 69 of the rod 68 may be enlarged to connect the same with the deck panel 3, and in the illustrated example is also provided with a tightening means, wherein the end thereof is threaded and provided with a mating nut, such that the rod 68 may be tensed from either or both ends. In the pool construction illustrated in FIG. 5, there are four linear deck panel subassemblies. Three deck panels 3 are connected in-line by a rod 68 for both sides of the pool, and two deck panels are interconnected in an aligned fashion for both ends of the pool. As shown in FIG. 5, a corner member 75 may be provided for interconnecting the non-linearly disposed, straight subassembly sections of the deck. The corner members 75 include a pair of depending end flanges 76 with an aperture aligned with the deck panel flange apertures 67 therethrough for receiving the rod 68 therein. In the illustrated example, the threaded end of each of the rods extends through the end flange of an associated one of the corner members 75, and a nut is then attached thereto and drawn taut against the end flange surface. In this manner, each of the linear deck sections is securely interconnected in a manner which may be easily disassembled and rearranged.

Figure 6:
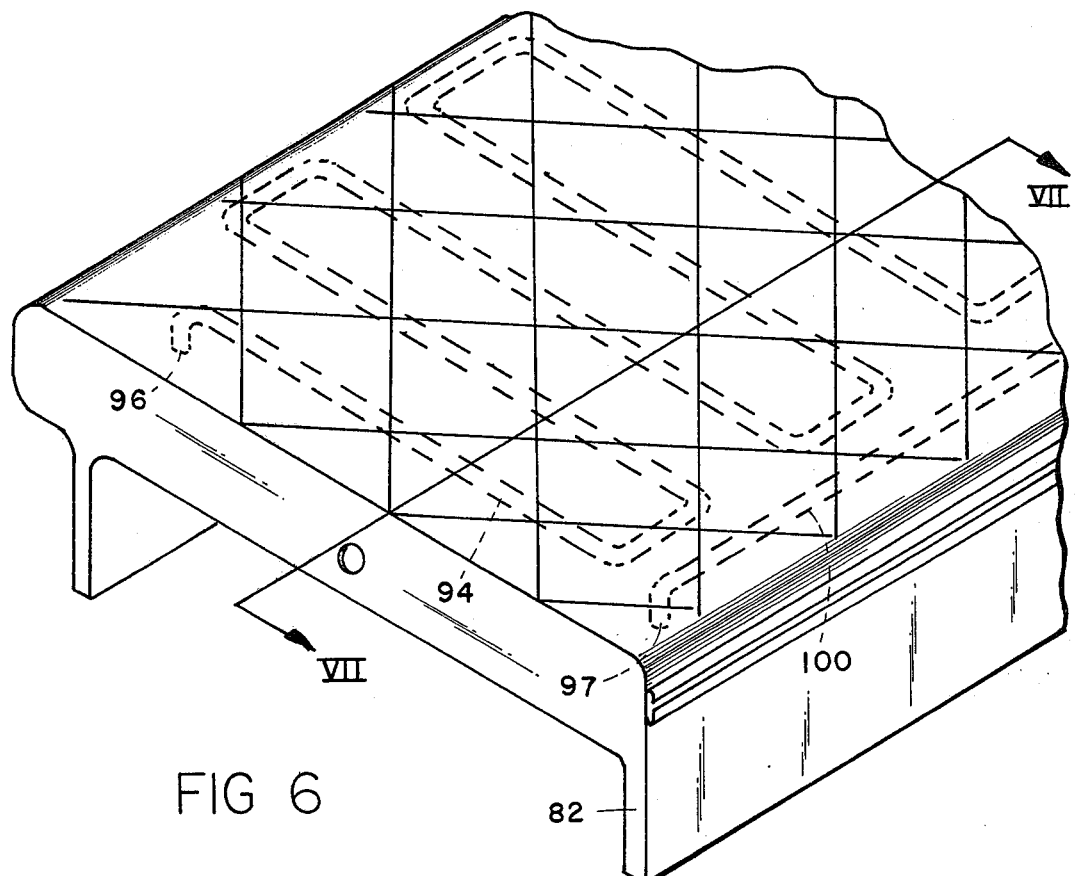
FIG. 6 is an enlarged fragmentary perspective view of the deck panel.

With reference to FIGS. 1 and 6, the deck panels 3 also include a downwardly extending rear flange 82 having a free edge 83 which extends below the cross brace 15 a distance sufficient to backfill dirt thereagainst and impart an appearance of permanence to the pool. The deck panels 3 also include a forward flange 84 which extends downwardly from the upper panel, and includes an L-shaped portion 85 which forms a coping lip about the interior edge of the deck, and an apron 86 depending therefrom in position abutting the exterior surface of the liner 12. Apron 86 includes a free edge 87 which extends downwardly below the level of cross brace 15 and extrusion 54 so as to cover the same to impart a neat appearance to the interior of the swimming pool construction. The exterior surface of the apron 86 may be provided with tile 87a adhered thereto, or integrally formed therein, or other attractive coverings to simulate permanent pool construction. The rear and front flanges together encase the above ground portions of the frame members, such that the pool has a finished, permanent appearance.

The illustrated deck panels 3 each include an extruded C-shaped channel 88 extending along the exterior surface of the rear flange 82. Channel 88 is positioned a spaced distance downwardly from the upper panel 64, and is adapted to retain the free edge of an enclosure dome 89 therein. The channel 88 comprises a plurality of segments, each being connected with a different one of the deck panels 3, and includes a narrow slit or aperture in which the dome free edge is inserted. The dome 89 is preferably constructed from a thin flexible sheet material, such as an imperforate plastic adapted to be erected by inflation, and has the free edge thereof enlarged to facilitate connection in the channel segments.

Figure 7:
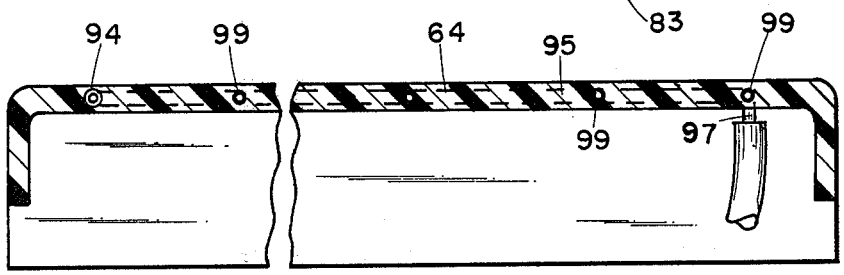
FIG. 7 is a vertical cross sectional view of the deck panel taken along plane VII—VII, FIG. 6.
Figure 8:
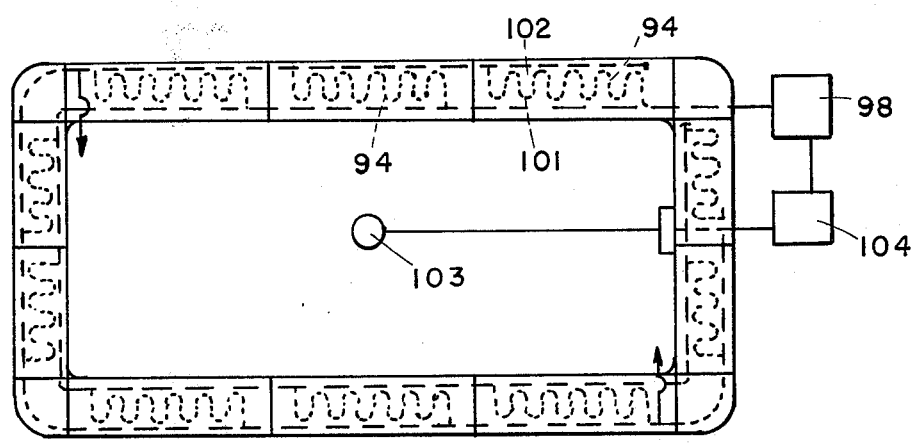
FIG. 8 is a partially schematic top plan view of the swimming pool construction, wherein the deck panels are provided with a water passageway to cool the same.

With reference to FIGS. 6-8, in one embodiment of the present invention, the upper deck panel 64 includes a water passageway 94 extending along a tortuous path through the deck at an elevation adjacent to the exterior surface 95 of the panel. The water passageway 94 has inlet and outlet ends 96 and 97 respectively which communicate with the water in the pool through parallel inlet and outlet headers 101 and 102 (FIGS. 3 and 8). A pump 98 (FIG. 8) is provided to flow the water in the pool through inlet header 101 and thence through each passageway 94 then out through outlet header 102 and then into the pool whereby solar heat collected in the deck through exposure of the deck exterior surface 95 to sunlight is transferred to the water in the passageway through thermal conductivity, thereby heating the water in the pool, and simultaneously cooling the exterior surface of the swimming pool deck. In the illustrated structure, the water passageway 94 is formed by an elongate section of tubing 99 which is molded integrally with the deck panel, and extends through each of the panels in an "S" or "U" shaped pattern. Water inlet 96 is disposed adjacent to the forward portion of one of the panel ends and extends therefrom through the tortuous "S" pattern back and forth from the forward to the rearward edge of the panel 64, and continues this pattern to the opposite end of the panel, at which point a straight return line 100 extends therefrom to the outlet 97 at the point of origin of the passageway on the rearward edge of the panel. In this manner, each of the deck panels 3 includes a separate or self-contained passageway, such that the same are interchangeable or modularized and can be variously interconnected to construct different pool configurations.

With reference to FIG. 8, a pool drain 103 is provided at a convenience spot in the pool, well below the free surface of the water, and is connected with the pump 98 through a filtering device 104 (FIG. 8). Pump 98 draws water from the pool through the drain 103 and filter 104, and expels the same under pressure into the inlet header 101, thereby flowing the pool water through the passageway 94 of each of the deck sections 3. As the relatively cool water in the pool flows through the passageway, the heat collected in the deck sections through exposure to direct sunlight is transmitted thereto, thereby heating the water, and simultaneously cooling the deck. The heated water is then returned through the outlet 97 into the outlet header 102, and is in turn communicated with the pool, thereby raising the temperature of the water to a comfortable level for swimming.

Figure 9:
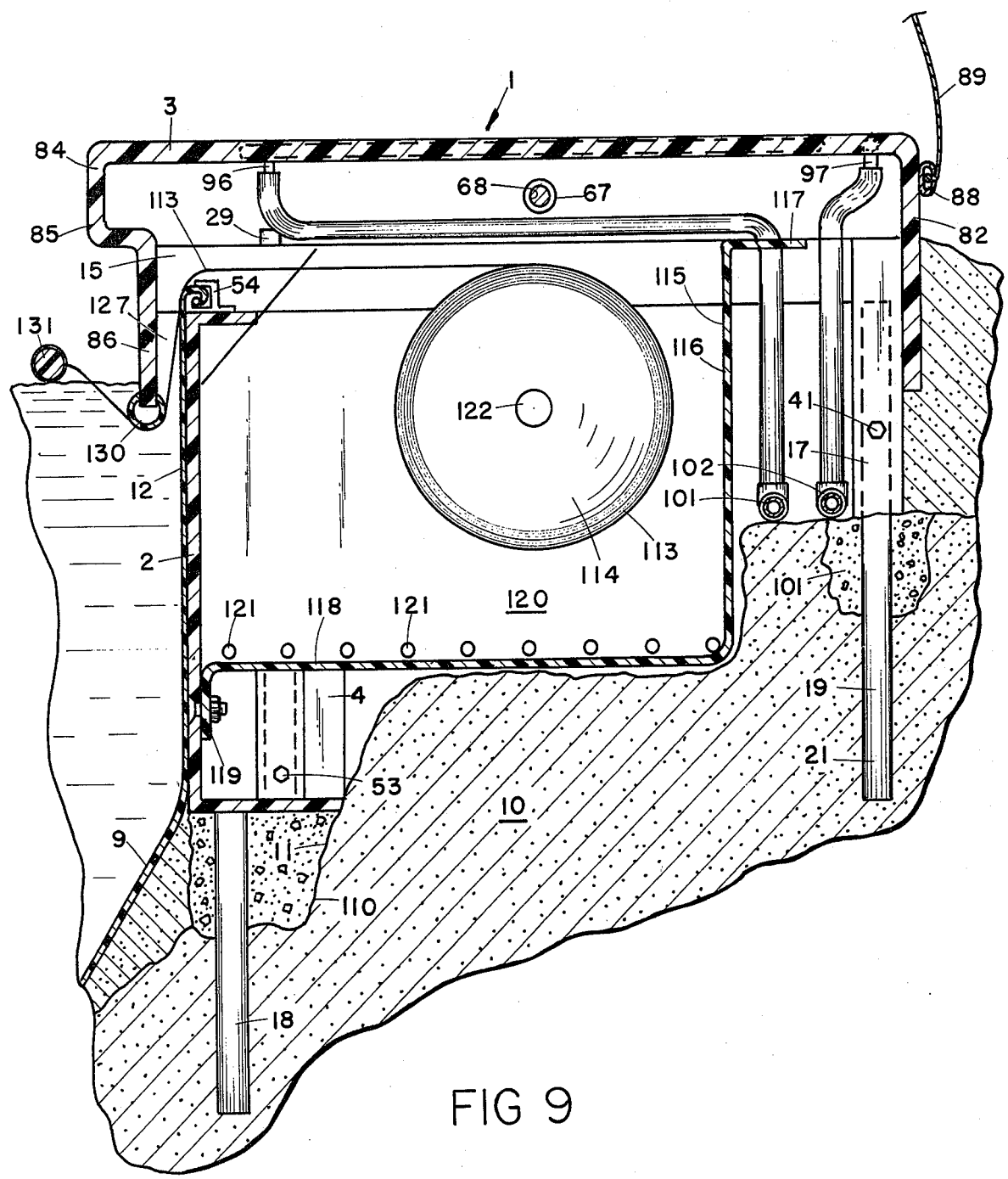
FIG. 9 is a vertical cross sectional view of the pool construction, taken along the line IX—IX, FIG. 5, and showing a pool cover mounted on a rotatable drum.

With reference to FIG. 9, the swimming pool construction 1 preferably includes a flexible pool cover 113 mounted in one end of the pool for extending and retracting the cover over the surface of the water. A drum or roller 114 is rotatably mounted in each of the spacees formed below the deck panels 3 and rearwardly of the side panels 2. The cover 113 comprises a plurality of elongate strips wound about an associated roller for convenient and safe storage. An L-shaped housing 115 forms the space in which each roller 114 is mounted, and includes a rear wall 116 with an upper flange 117 connected with the cross brace 15, a bottom panel 118 connected with the side panels 2 by a flange 119, and opposing end walls 120 each having a plurality of drain apertures 121 along the lower edge thereof to drain water from the housing 115 into the ground surrounding the pool. The rollers 114 are axially supported on a single axle 122, which includes a crank 123 (FIG. 5) on at least one end thereof to rotate the rollers. A hatch and hinged door 124 in the corner member 75 provides access to the crank 123.

Openings 127 (FIG. 9) are provided between the deck panels 3 and the roller housings 115, through which the pool cover 113 strips extend, to permit the cover to be unwound from the rollers to cover the pool, and wound onto the rollers to store the cover in a concealed manner. In the illustrated structure, the deck panel aprons 86 are spaced apart from the side panels 2 and liner 12 to define openings 127 therebetween, through which the cover strips 113 are threaded. The illustrated cover 113 is therefore split longitudinally into two strips or sections 128 and 129 (FIG. 5) which straddle the center frame 4. An arcuately shaped bead 130 (FIG. 9) is connected with the lower edge of the deck panel apron 86 by way of a split construction which envelopes the edge. A float 131 is connected with the free end of each cover strip, and supports the same upon the surface of the water.

The cover strips 128 and 129 extend from the rollers 114 to the liner clamp 54, and extend downwardly therefrom into the openings 127 between the apron 86 and the liner 12. The cover 113 extends about the lower rounded surface of the bead 130 into the pool, with the separate cover segments 128 and 129 disposed in a side-by-side relation on opposing sides of the center frame 4. The free ends of both cover segments 128 and 129 are interconnected and supported by the float, such that diverging the float 131 from the subject pool end pays or unwinds the cover 113 from the rollers 114 and keeps the pool clean when the pool is not being used. The cover 113 alleviates heat loss from the pool water during the night and/or cool days, and improves solar absorbtion during sunny days, as a result of its preferably dark color, such as black. The cover 113 also prevents debris and other foreign material from entering the water when the pool is not in use.

It is to be understood that the solar heating deck, the pool cover, and the domed pool closure and connecting channel arrangement are all aspects of the present invention which may be practiced independently, and in conjunction with different deck frame designs.

In use, the pool is constructed by first digging a hole 8 (FIG. 1) in the earth a size substantially commensurate with the desired size or the pool. The shallow ledge 11 is formed about the marginal edge of the pool, and the steep side walls of the pool are lined with sand 9. Frames 4 are positioned at regular intervals about the marginal edge 109, and markings are made at distances thereabout commensurate with the length of the modular deck panels 3. Aligned holes 101 are provided at the forward and rearward portions of the ledge 11, and are spaced apart a distance equal to the distance between the frame leg sleeves 16 and 17. The frame anchoring posts 18 and 19 are then slid down through sleeves 16 and 17 into the holes 101 and are driven into the ground in a substantially vertical orientation, whereby the same are disposed mutually parallel. A drive pipe which fits into the top of sleeves 16 and 17 may have to be used to drive posts 18 and 19 into the ground. An anchor is formed about the lower leg end by means such as pouring a little unsolidified concrete into the holes 101. After the concrete has cured, so as to anchor the legs 18 and 19 securely therein, the cross brace 15 is rough leveled to a substantially horizontal orientation, and to an elevation which is commensurate with that of the other cross braces. Set screws 39 and 41 are tightened. Side panels 2 are then connected between each of the frames 4, and the free edge of liner 12 is inserted in extrusion 54. A seal 132 (FIG. 1) may be connected to the sleeves 17 about the outer periphery of the pool to seal with the rear flange 82 of the deck panels 3. Deck panels 3 are then placed on frames 4 with the end flanges 65 thereof abutting and disposed between the tabs 29. The rods 68 are fed through the end flange apertures 67 as each of the deck panels is set in place on the frames. Deck panels 3 are then finished leveled by slightly loosening the set screws 39 and 41 and adjusting the elevation of the frame, side wall and deck panel by sliding the same either up or down on the legs 18 and 19 a distance sufficient to bring the structure to a level condition. The set screws 39 and 41 are tightened, thereby locking the legs securely in place. Because the cross brace is adjustable in infinitesimally small increments, the deck can be accurately and easily leveled. Nuts are then connected on the ends of the rods 68 and the same are tightened so as to securely interconnect each of the deck panels. The ledge 11 may then be backfilled against the inside surface of the side panels, and covering the anchors, to provide additional support for the frames and side panels. Dirt is then backfilled against the rear flange 82 of each of the deck panels 3, thereby imparting a fully-inground, permanent appearance to the pool. If an enclosure dome is to be constructed about the pool, the outer free edge thereof is fastened in the clamp 88.

In the foregoing description, it will be readily appreciated by those skilled in the art that many modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. In a swimming pool construction including a plurality of prefabricated panels to form a deck assembly about a marginal portion of the pool, the improvement comprising:
    means for interconnecting said deck panels, including:
        a pair of flanges depending from the ends of each of said deck panel sections, and including a pair of aligned apertures disposed therethrough; said deck panel sections being positioned in an end-to-end relationship, and each of said flange apertures being aligned; first and second ones of said deck panel sections being disposed at opposite ends of said deck panel sections being disposed at opposite ends of said deck assembly; and
        an elongate, rigid rod extending through each of said apertures and including means connecting one end of the rod with said first deck panel section, and tightening means on the other end of said rod, engaging the second deck panel section for moving the one rod end with respect thereto and tensing the rod, whereby each of said deck panel sections is drawn abuttingly together by said rod to securely and detachably interconnect each of the deck panel sections in said deck assembly; and
    a corner member for interconnecting non-linearly disposed straight sections of the deck assembly, having a pair of depending end flanges with an aperture aligned with said deck panel flange apertures therethrough for connection with one end of said rod.

2. In a swimming pool construction having a reservoir adapted to retain water therein, and a deck disposed about a marginal portion of the reservoir to facilitate ingress and egress therefrom, said deck including an exterior surface thereof adapted for walking thereon, and exposed to sunlight; the improvement comprising:
    a water passageway extending along a path through said deck at an elevation adjacent to the exterior surface thereof; said passageway having inlet and outlet ends thereof communicating with the water in said pool; and pump means for flowing the water in the pool through said passageway, whereby solar heat collected in said deck through the exposure of said deck exterior surface to sunlight is transferred to the water in said passageway through thermal conductivity, thereby heating the water in the pool, and simultaneously cooling the exterior surface of the swimming pool deck.

3. A pool construction as set forth in claim 2 wherein:
said deck comprises a plurality of prefabricated panels interconnected in an end-to-end fashion.

4. A pool construction as set forth in claim 3 wherein:
each of said deck panels includes a separate passageway with corresponding inlet and outlet ends; and including
an inlet header interconnecting each passageway inlet; and
an outlet header interconnecting each passageway outlet.

5. In a swimming pool construction including a plurality of prefabricated deck panels and side wall panels the improvement of a cover arrangement comprising:
a space formed beneath each pair of deck and side wall panels at one end of said pool; an opening between each pair of deck and side wall panels; a roller mounted within each space; each roller being mounted on a common axle for simultaneous rotation; a pool cover strip wound on each roller and extending out through the associated opening; means for interconnecting the free end of each pool cover strip in a side-by-side relationship, whereby each pool cover strip is simultaneously unwound from its respective roller to cover said pool, and wound onto its respective roller for storage in a concealed manner within said space.

6. A swimming pool construction as set forth in claim 5 wherein:
said deck panels each have a front flange which extends below a top edge of the associated side wall panel, and includes a lower terminal edge; and an elongate bead being split longitudinally for connecting the bead with each deck flange terminal edge on said pool one end, and having a rounded transverse cross sectional shape for non-injurious abutment with said cover strips, and guiding the same over each associated deck flange terminal edge.

7. A swimming pool construction as set forth in claim 6 including:
a float connected with the free end of each pool cover strip and supporting the same upon the surface of the water.

8. A swimming pool construction as set forth in claim 7 including:
a crank connected with one end of said axle; and a hatch and hinged door to provide access to said crank.

9. A swimming pool construction as set forth in claim 5 including:
a float connected with the free end of each pool cover strip and supporting the same upon the surface of the water.

10. A swimming pool construction as set forth in claim 5 including a crank connected with one end of said axle; and a hatch and hinged door to provide access to said crank.

11. A swimming pool construction comprising:
a plurality of frames supporting a plurality of deck sections and a plurality of wall panels; each of said frames including a rigid cross brace and first and second tubular sleeves connected with and depending from said cross brace in a spaced apart relationship; each of said deck sections including a downwardly turned end flange at each end thereof seated on one of said cross braces, with abutting deck sections having abutting end flanges seated on a common cross brace; first and second anchoring posts, each having one end thereof adapted for anchoring in the ground at a position adjacent to a marginal portion of the pool, and the other end thereof telescopically received into said first and second sleeves respectively; means connecting said first and second posts with said first and second sleeves respectively, whereby the elevation of each of said deck sections is adjustable in infinitesimally small increments for accurately leveling and securely supporting the deck sections; bracket means being secured to said first sleeve on a rear side thereof, toward said second sleeve, said bracket means being approximately as thick as said first sleeve from side to side; each of said wall panels being slightly shorter than said deck sections by a thickness of said first sleeve; each of said wall panels including an inwardly turned end flange abutting a side of said first sleeve and said bracket means with adjacent wall panels abutting opposite sides of said first sleeve; fastening means securing said adjacent wall panels to said bracket means and to each other through said bracket means; liner receiving means mounted on the top of said wall panels; a pool liner having a marginal edge secured in said liner receiving means, said liner forming a water containing reservoir and concealing the front of said first sleeve from view.

12. A swimming pool construction as set forth in claim 11 wherein:
each of said deck sections includes a front flange extending over said liner marginal edge and covering the same.

13. A swimming pool construction as set forth in claim 12 including:
a channel extending along a rearward surface of each of said deck panels; a flexible dome enclosing the pool and including a marginal free edge thereof mounted in said channel; and means supporting said dome in an expanded condition over said pool.

14. A swimming pool construction as set forth in claim 11 having means for interconnecting at least two adjacently disposed straight sections of said deck sections and retaining the same in an assembly; said interconnecting means including;
a flange depending from each of said straight deck sections and including an aperture disposed therethrough; said straight deck sections being positioned in an end-to-end relationship, and each of the flange apertures being aligned; first and second ones of said straight deck sections being disposed at opposite ends of said assembly; and
an elongate, rigid rod extending through each of said apertures and including means connecting one end of the rod with said first straight deck panel section, and tightening means on the other end of said rod, engaging the second straight deck panel section for moving the one rod end with respect thereto and tensing the rod, whereby each of said straight deck sections is drawn abuttingly together by said rod to securely and detachably interconnect each of the straight deck sections in the assembly.

15. A swimming pool construction as set forth in claim 14 including:
a corner member for interconnecting non-linearly disposed straight deck sections; said corner members having a pair of depending end flanges with an aperture aligned with the said deck panel flange apertures therethrough for connection with one end of said rod.

16. A swimming pool construction as set forth in claim 14 wherein each of said deck sections includes a water passageway extending along a tortuous path therethrough at an elevation adjacent to an exterior surface thereof; said passageway having inlet and outlet ends thereof communicating with the water in the pool; and
pump means for flowing the water in the pool through the passageway, whereby solar energy collected in the deck sections through exposure of the same to sunlight is transferred to the water in the passageway through thermal conduction, thereby heating the water in the pool, and simultaneously cooling the exterior surface of the swimming pool deck sections.

17. A swimming pool construction as set forth in claim 16 wherein each of the deck sections includes a separate passageway with corresponding inlet and outlet ends; and including an inlet header interconnecting each passageway inlet; and an outlet header interconnecting each passageway outlet.

18. A swimming pool construction as set forth in claim 16 comprising a space beneath said deck sections and behind said wall panels at least at one end of said pool; an opening between said deck sections and said wall panels; roller means located within said space; a pool cover wound on said roller means and extending out through said opening, whereby said pool cover can be unwound from said roller means to cover said pool, and wound onto said roller means so as to be stored in a concealed manner within said space.

19. A swimming pool construction as set forth in claim 14 including:
a space beneath said deck sections and behind said wall panels at least at one end of said pool; an opening between said deck sections and said wall panels; roller means located within said space; a pool cover wound on said roller means and extending out through said opening, whereby said pool cover can be unwound from said roller means to cover said pool, and wound onto said roller means so as to be stored in a concealed manner within said space.

20. A swimming pool construction as set forth in claim 11 wherein each of said deck sections includes a water passageway extending along a tortuous path therethrough at an elevation adjacent to an exterior surface thereof; said passageway having an inlet and an outlet communicating with the water in the pool; and
pump means for flowing the water in the pool through the passageway, whereby solar energy collected in the deck sections through exposure of the same to sunlight is transferred to the water in the passageway through thermal conduction, thereby heating the water in the pool, and simultaneously cooling the exterior surface of the swimming pool deck sections.

21. A swimming pool construction as set forth in claim 20 wherein:
each of said deck sections includes a separate passageway with a corresponding inlet and outlet; and including
an inlet header interconnecting each passageway inlet; and
an outlet header interconnecting each passageway outlet.

22. A swimming pool construction as set forth in claim 11 comprising a space beneath said deck sections and behind said wall panels at least at one end of said pool; an opening between said deck sections and said wall panels; roller means located within said space; a pool cover wound on said roller means and extending out through said opening, whereby said pool cover can be unwound from said roller means to cover said pool, and wound onto said roller means so as to be stored in a concealed manner within said space.

23. A swimming pool construction as set forth in claim 22 wherein:
said deck sections have a front flange which extends below a top edge of said wall panels, and includes a lower terminal edge; and an elongate bead being split longitudinally for connecting the bead with the deck flange terminal edge, and having a rounded transverse cross sectional shape for non-injurious abutment with said pool cover, and guiding the same over said deck flange terminal edge.

24. A swimming pool construction as set forth in claim 23 including:
a float connected with a free end of said pool cover and supporting the same upon the surface of the water.

25. A swimming pool construction as set forth in claim 24 wherein:
said space is defined by a housing connected with said deck and said wall, and having said roller means rotatably mounted therein.

26. A swimming pool construction as set forth in claim 25 including:
a crank connected with one end of said roller means, and a hatch and hinged door therefor in one of said deck sections to provide access to said crank.

27. A swimming pool construction as set forth in claims 11, 12, 13, 14, 15, 16, 17, 18, 19, 20, 21, 22, 23, 24, 25, or 26 wherein:
said rigid cross brace and said first and second sleeves are integrally formed of a generally rectangular segment of metal tubing cut through three walls at two spaced apart points and bent on the fourth wall at both of said points.

28. In a removable swimming pool construction including a plurality of side wall panels, deck panels, and a flexible liner with an upper portion thereof extending above the normal water line of said pool construction and being exposed, the improvement comprising:
means for connecting a free edge of said liner with said side wall panels at a position above the normal water line of said pool construction; and
an apron extending about an inside marginal edge of said pool construction; said apron being formed integrally with said deck panels, depending therefrom to a point spaced below the normal water line of said pool construction, and overlying the otherwise exposed, upper portion of said liner sufficiently close for alleviating deterioration and damage thereto, and concealing said liner connecting means.

29. A pool construction as set forth in claim 28 wherein:
said apron includes an outer surface having a decorative pattern thereon.

30. A pool construction as set forth in claim 28 wherein:
said connecting means comprises a channel-shaped clamp connected with an upper flange portion of said side wall panels, and having the free edge of said flexible liner retained therein; and
said flexible liner is disposed abuttingly against said side wall panels.

31. A pool construction as set forth in claim 28 wherein:
said apron includes an outer surface having a decorative pattern thereon;
said connecting means comprises a channel-shaped clamp connected with an upper flange portion of said side wall panels, and having the free edge of said flexible liner retained therein; and
said flexible liner is disposed abuttingly against said side wall panels.

* * * * *

UNITED STATES PATENT AND TRADEMARK OFFICE
CERTIFICATE OF CORRECTION

PATENT NO. : 4,333,186

DATED : June 8, 1982

INVENTOR(S) : Jay A. Lankheet

It is certified that error appears in the above—identified patent and that said Letters Patent is hereby corrected as shown below:

Column 1, line 55:

"assemnbly" should be --assembly--

Column 3, line 54:

"forms" should be --form--

Column 3, line 57:

"end" should be --ends--

Column 6, line 24:

"convenience" should be --convenient--

Column 6, line 45:

"spacees" should be --spaces--

Column 7, line 24:

"absorbtion" should be --absorption--

UNITED STATES PATENT AND TRADEMARK OFFICE
CERTIFICATE OF CORRECTION

PATENT NO. : 4,333,186

DATED : June 8, 1982

INVENTOR(S) : Jay A. Lankheet

It is certified that error appears in the above—identified patent and that said Letters Patent is hereby corrected as shown below:

Column 7, line 35:

"or" should be --of--

Signed and Sealed this

Twenth-eighth Day of September 1982

[SEAL]

Attest:

Attesting Officer

GERALD J. MOSSINGHOFF

Commissioner of Patents and Trademarks